Figure 5:
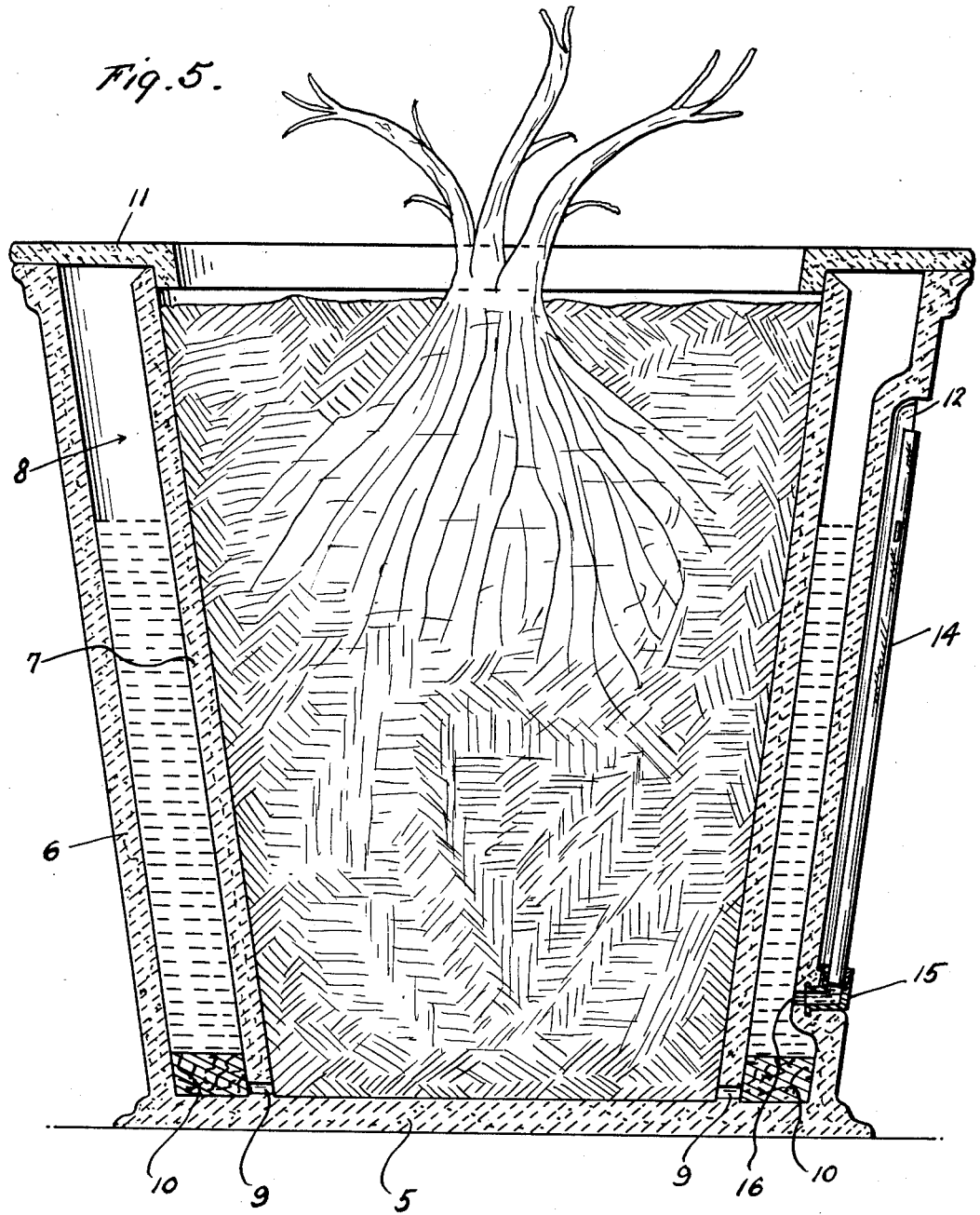

Dec. 19, 1933.  E. BRANDT  1,940,044
FLOWERPOT
Filed March 3, 1933  2 Sheets-Sheet 1
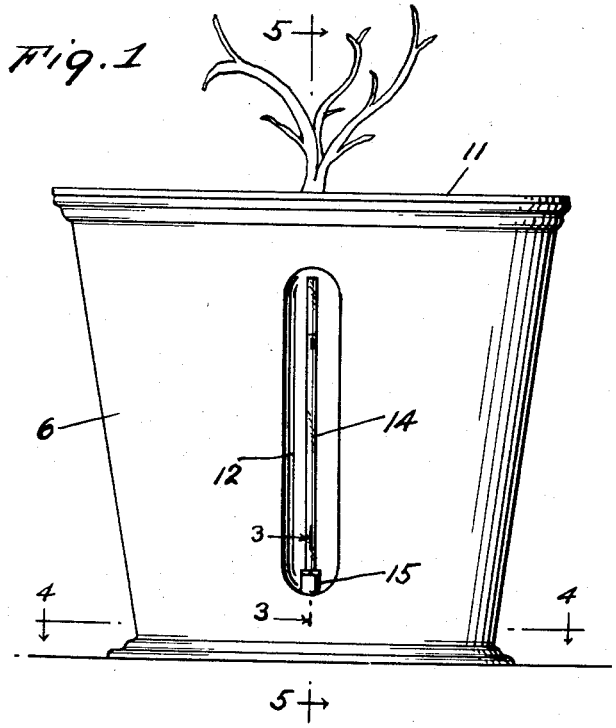
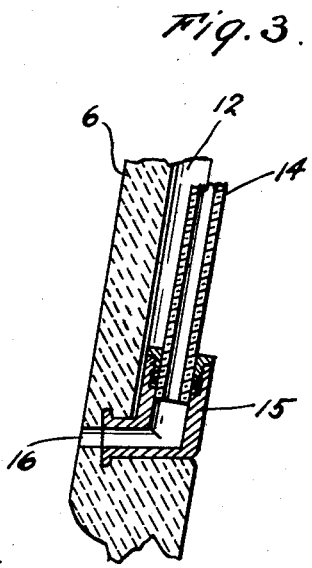
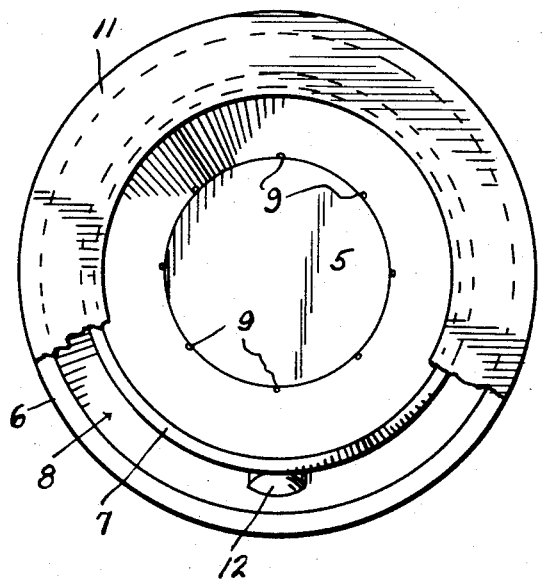
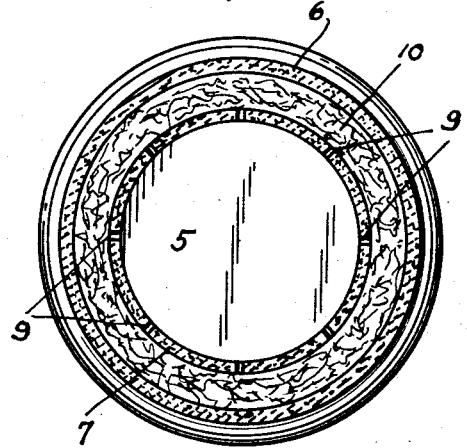
Inventor
Erick Brandt
By *Clarence A. O'Brien*
Attorney Dec. 19, 1933. E. BRANDT 1,940,044
FLOWERPOT
Filed March 3, 1933  2 Sheets-Sheet 2

Inventor
Erick Brandt
By Clarence A. O'Brien
Attorney

Patented Dec. 19, 1933

1,940,044

UNITED STATES PATENT OFFICE 1,940,044

FLOWERPOT

Erick Brandt, Westbrook, Minn.

Application March 3, 1933. Serial No. 659,555

3 Claims. (Cl. 47—38)

The present invention relates to a flower pot and has for its object to provide means whereby the flower pot may be properly watered without the necessity of using a saucer or other device in conjunction therewith, as is now the common practice.

Another very important object of the invention resides in the provision of a flower pot of this nature whereby the proper moisture may be maintained for the plant being grown and the structure is comparatively simple, inexpensive to manufacture, strong and durable, thoroughly efficient and reliable in use and otherwise well adapted to the present form for which it is designed.

With the above and numerous other objects in view as will appear as the description proceeds, the invention consists in certain novel features of construction, and in the combination and arrangement of parts as will be hereinafter more fully described and claimed.

Figure 1 is a side elevation of a flower pot embodying the features of my invention, Figure 2 is a top plan view thereof with the cover rim partly broken away, Figure 3 is an enlarged detail section taken substantially on the line 3—3 of Figure 1, Figure 4 is a horizontal section taken substantially on the line 4—4 of Figure 1, Figure 5 is a vertical section taken substantially on the line 5—5 of Figure 1.

Referring to the drawings in detail, it will be seen that the numeral 5 denotes a base from which rises an outer inverted frusto-conical shaped wall 6 and an inner frusto-conical shaped wall 7 spaced from the wall 6 so as to provide the water compartment between the walls denoted by the numeral 8. At the bottom of the wall 7 there are provided apertures 9. A wick structure 10 is mounted in the bottom of the compartment 8 and the water in the compartment 8 is fed through this wick structure through the apertures 9 into the interior of the flower pot. The numeral 11 denotes a rim cap closing the compartment 8 at the top thereof and being movable so that this compartment may be filled as desired.

The wall 6 is provided in its outer surface with an indentation or recess 12 in which is mounted a glass tube 14 connected with an L nipple or coupling 15 in the bottom of the recess extending to communicate with an opening 16 leading into the compartment 8 slightly above the wick 10. The level of the water in the compartment 8, therefore, is visible through the tube 14 which is made of glass or other transparent material.

It is thought that the construction, utility and advantages of this invention will now be clearly understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:—

1. A flower pot of the class described including a base, an outer inverted frusto-conical shaped wall rising from the base, an inner inverted frusto-conical wall rising from the base spaced inwardly from the outer wall and having apertures at the lower portion thereof, said outer wall having a recess in the outer surface thereof, a transparent tube mounted in the recess and communicating with the space between the walls at the bottom end of the recess.

2. A flower pot of the class described including a base, an outer inverted frusto-conical shaped wall rising from the base, an inner inverted frusto-conical wall rising from the base spaced inwardly from the outer wall and having apertures at the lower portion thereof, said outer wall having a recess in the outer surface thereof, a transparent tube mounted in the recess and communicating with the space between the walls at the bottom end of the recess, a wick structure in the lower portion of the space between the walls, the inner wall being apertured to communicate with the interior of the pot.

3. A flower pot of the class described including a base, an outer inverted frusto-conical shaped wall rising from the base, an inner inverted frusto-conical wall rising from the base spaced inwardly from the outer wall and having apertures at the lower portion thereof, said outer wall having a recess in the outer surface thereof, a transparent tube mounted in the recess and communicating with the space between the walls at the bottom end of the recess, a wick structure in the lower portion of the space between the walls, the inner wall being apertured to communicate with the interior of the pot, a cap ring on the pot at the upper edges of the two walls to close the space therebetween.

ERICK BRANDT.